Oct. 22, 1935.  R. O. HENSZEY  2,018,361
FLUID METER
Filed Feb. 23, 1929
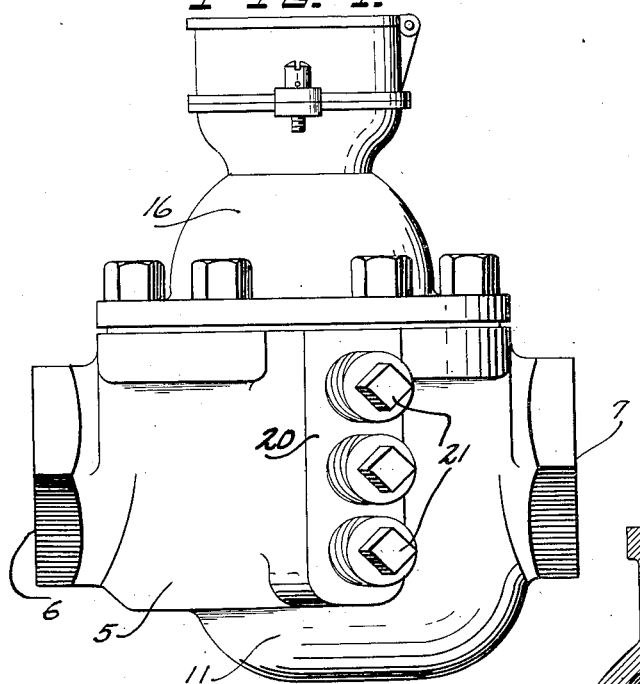
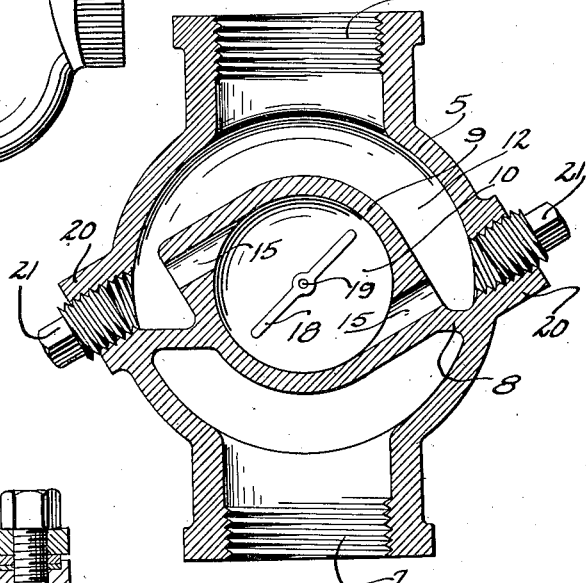
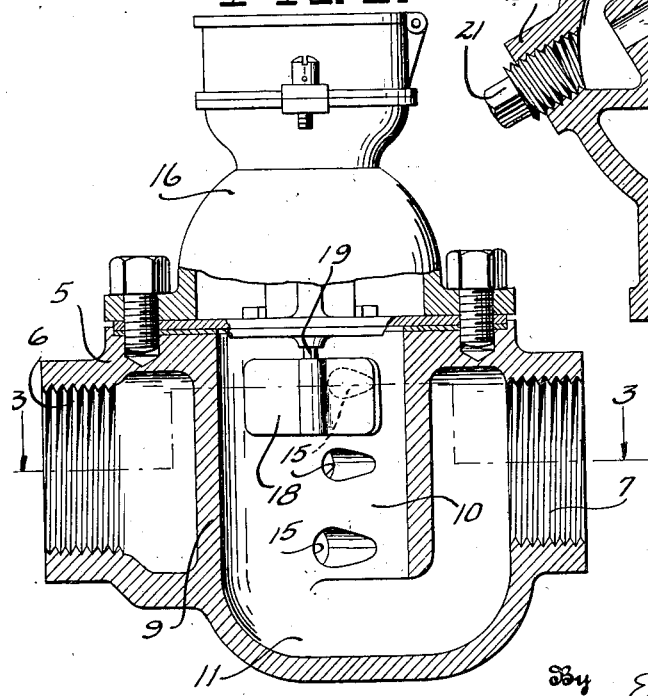
Inventor
Roy O. Henszey
By Erwin, Wheeler & Woolard
Attorneys Patented Oct. 22, 1935

2,018,361

UNITED STATES PATENT OFFICE 2,018,361

FLUID METER

Roy O. Henszey, Oconomowoc, Wis.

Application February 23, 1929, Serial No. 341,880

12 Claims. (Cl. 73—37)

This invention relates to improvements in meters.

It is the primary object of the invention to provide an improved form of meter for measuring the flow of dirty liquids with accuracy. In the ordinary form of meter a close fit of the parts is essential to accuracy and because of this fact foreign matter in the fluid to be measured frequently results in a stoppage of the meter.

I am particularly concerned with the measurement of such liquids as boiler blow-off with which much foreign matter, both soluble and insoluble, must necessarily be discharged with the water passing from the boiler through the meter to the point of blow-off. It is my purpose to provide a meted design such that insoluble foreign matter cannot readily clog the meter nor can soluble foreign matter readily deposit upon the meter to build up scale which might ultimately destroy the accuracy of the device, nor can the foreign matter abrade the relatively light moving parts.

Further the design is such that deposit on the measuring chamber and parts will have very little affect on accuracy.

In obtaining the objects which I have in mind I employ nozzle orifices for the fluid to be metered which are so arranged as to produce a vortex in which the movement is both peripheral and axial in a cylindrical meter chamber one end of which is preferably entirely open so that the fluid travels a helical path through the chamber, scouring the wall thereof. Preferably also the chamber is vertical so that the fluid is supported therein only by its own revolution and inertia.

The registering mechanism, instead of being driven by some positive motor is operated by means of a small rotor so disposed as to respond to the vortex action of the helically moving liquid in the meter chamber.

I am aware that meters have heretofore been made for operation by means of a jet of water impinging upon a paddle-wheel. The device of the present invention however is so organized that rotation of the rotor is induced by the vortex action and not by impingement of any jet thereon. The fact that the rotor turns at exactly the same rate as the water avoids eddy currents, friction and abrasion and is thereby greatly conducive of accuracy.

It is my further purpose, where the size of the meter permits, to provide a vertical series of jets opening into the meter chamber and so organized that heavy particles of foreign matter will tend to pass through jets which are below the rotor, the effluent acting upon the rotor being maintained in motion, regardless of friction by contact with the whirling or revolving mass of liquid discharged by jets opening into the chamber nearer its outlet.

In the drawing:

Figure 1 is a side elevation of a meter embodying my invention.

Figure 2 is a vertical axial section through the motor portion of such a meter.

Figure 3 is a detail taken on the section indicated at 3—3 in Figure 2.

Like parts are identified by the same reference characters throughout the several views.

The meter casing 5 is provided with an inlet at 6 and an outlet as 7 separated by a transverse partition 8 within an enlargement 9 of which the meter chamber 10 is formed. The meter casing is provided at 11 with a bowl-shaped depression best shown at Figure 2 with which the cylindrical meter chamber 10 directly communicates and which opens into the outlet port 7 of the casing.

The wall portion 9 of partition 8, whereby the meter chamber 10 is formed, is surrounded by a passage 12 communicating with the inlet port 6 of the meter. From passage 12 a series of vertically spaced nozzle orifices 15 lead tangentially into chamber 10. To this end the points of intersection of their respective axes with the annular wall of the meter chamber 10 are diametrically opposite. It is not necessary, but it is preferred, that the oppositely disposed openings of these nozzle jets should be in the same horizontal plane.

The number of nozzle jets and their size will depend upon the predetermined rating or capacity of the meter. Upon such determination will also depend the characteristics of the gear train employed in the registering mechanism housed within the meter cap 16.

In the particular meter herein disclosed there are two sets of nozzles each comprising three vertically spaced orifices. The rotor 18 is shown disposed in the preferred position; that is in the path of fluid issuing from only the upper orifices of the respective series, but the rotor can be anywhere on the axis of the chamber above or below these jets. The whirling of fluid in chamber 10 induced by the cylindrical form of the chamber and the tangential disposition of the inlet orifices 15 will create a vortex in the chamber which will, in its rotation, carry with it the single or multiple bladed rotor 18 whereby the shaft 19 upon which such rotor is mounted will turn at the same rate at which the fluid is whirling within chamber 10. The opening of the bottom of the metering chamber into the outlet passage is such as to adapt the metering chamber for peripheral discharge of the entire helical stream moving therethrough without obstruction.

While the effluent from the lower orifices of the two sets does not act directly upon the rotor 18 it does nevertheless contribute in several particulars to the accuracy of the meter.

In the first place the vortex created by the lower jets tends to maintain its level upon the wall of chamber 10 and thus acts to support in intimate contact with the rotor 18 the effluent whirling in the plane of such rotor and emitted from the uppermost nozzles opening into the chamber.

In the second place the vortex created by the lower jet tends to keep the lowermost stratum of water acting on rotor 18 in rotation at substantially the same rate as the effluent directly in the plane of the uppermost nozzles 15, thus minimizing friction effects.

Thirdly the lowermost nozzles of the respective series are preferably somewhat larger than the upper nozzles thereby encouraging the delivery of solid foreign matter through the meter at a point where such matter will not impinge upon nor affect the operation of the rotor 18.

It is important to note that the entire effluent which is rotating in a vortex in chamber 10 is supported therein solely by the effect of its rotation. Such chamber, as clearly shown in Figure 2, is wholly open at its bottom to facilitate the unobstructed discharge of fluid therefrom. I have found this to be a factor which contributes largely to the accuracy of the meter.

The rotor is of materially less diameter than the interior of the cylindrical chamber 10 in which it operates. This fact makes it possible for the rotor and the chamber both to become considerably incrusted with deposits of foreign matter before any affect on the accuracy of the meter will result. I have found however that in actual practice a meter constructed in accordance with the design herein disclosed will tend to remain highly polished interiorly due to the scouring effect of the fluid whirling therein.

Taking into consideration a fixed factor governed by the number and size of jets employed it will be found that the number of rotations of the shaft 19 will be in exact proportion to the amount of fluid passing through the meter. The gear train and registers to which such motion of shaft 19 is communicated are not illustrated for the reason that they correspond almost identically, except in ratio of gear reduction, to the registers and gear trains now in common use.

The particular meter illustrated has been constructed with a reduction of approximately 5000 to one whereas a standard disk meter of like capacity would ordinarily have a reduction of about 125 to one. In any given instance the gear train and register will be worked out in accordance with the proportion of the water which actually passes through those portions of chamber 10 in which the rotor 18 is disposed. It may be that the upper orifices of the opposing sets pass only one-tenth of the total volume of fluid traversing the meter. In such a case the gear train and register will be designed to give a reading ten times as high as the actual amount of water which has flowed through the orifices directly affecting the rotor.

Because of this arrangement for by-passing a large part of the water to be measured and because of the arrangement whereby the jets issuing from the orifices do not directly act upon the rotor I have been able to avoid the abrasion and cutting which are caused by the direct action of dirty water upon a paddle-wheel. At the same time I have avoided the eddy currents which are produced in the paddle-wheel type of meter and have provided a construction in which that portion of the water which is by-passed is made to contribute to the scouring of the meter passages and to the accuracy of meter readings, particularly when the rate of flow is relatively low.

While the meter herein disclosed is so designed that it is unlikely to become clogged under any ordinary circumstances, nevertheless the fact that it is designed for use particularly in connection with dirty boiler water has suggested the desirability of providing means for readily cleaning the orifices therein. To this end bosses 20 are provided at the sides of the meter casing and plugs 21 are threaded into openings tapped in such bosses in substantial alignment with the passages 15, whereby such passages may readily be cleaned if they become stopped.

It will be apparent from the foregoing description that there are advantages in having the meter chamber disposed with its axis vertical. It may, however, for certain purposes be used horizontally or with its axis inclined. I desire to be understood, therefore in the appended claims as referring to the structure, regardless of its specific installation wherever possible. If for example, the meter is installed with its vortex chamber in the same position other than that illustrated the reference in the claims to the "bottom" of the chamber may designate its discharge end and similarly the "top jets" may be understood to designate those jets most remote from the discharge end. In all such cases the claims may be read upon the structure as it would appear if installed in accordance with the drawing hereof.

I claim:

1. In a device of the character described, the combination with a meter chamber of substantially circular cross section provided with an off-center inlet for admitting to said chamber a fluid to be measured and an unobstructed outlet adapted for direct peripheral discharge of the full stream moving about the chamber whereby to permit the egress of such fluid from said chamber substantially unimpeded, of a rotor disposed within said chamber and subject to a vortex produced therein, said rotor being substantially co-axial with said chamber whereby to turn freely at the rate of rotation of said vortex.

2. In a device of the character described, the combination with a meter chamber of circular cross section provided with an unobstructed outlet opening of full diameter at its bottom and with a plurality of tangential inlets axially remote from said outlet opening and adapted to induce helical rotation in said chamber of fluid delivered thereto, of a rotor co-axial with said chamber spaced from the side wall thereof and adapted to partake of the rotative movement of such fluid in its path between said inlets and the open bottom of said chamber, whereby to be subject substantially solely to a freely rotating vortex in said chamber.

3. In a device of the character described, the combination with a metering chamber of substantially circular cross section provided with a substantially tangential inlet and an open lower end whereby fluid entering said chamber is adapted to pass through said chamber between said inlet and said lower end and whereby such fluid is unsupported mechanically in passing through said chamber, of a rotor mounted in said chamber in the path of fluid therein, and means below said rotor and said first inlet and providing a secondary inlet of larger cross sectional area than said first inlet and so disposed as to maintain the rotative movement of said fluid in the form of a vortex, whereby fluid admitted through said secondary inlet will contribute to the support of fluid admitted through said first mentioned inlet pending the action of such fluid on said rotor.

4. In a device of the character described, the combination with a metering chamber of circular cross section open at its lower end and provided with a substantially tangential inlet axially remote from said end, of a rotor mounted in said chamber and adapted to partake of the rotative component of movement of fluid passing through said chamber helically between said inlet and the open lower end thereof, said chamber being provided with a secondary inlet below the plane of said rotor therein.

5. A device of the character described, comprising a casing having inlet and outlet passages, a chamber of circular cross section within said casing connected by webs to the sides thereof, the wall of said chamber being provided with a substantially tangential nozzle communicating with the inlet passage of said casing and the bottom of said chamber axially remote from said nozzle being in unobstructed peripheral communication with the outlet passage from said casing, and a flow responsive device including a rotor disposed within said chamber spaced centrally from the wall thereof and subject to the vortex of fluid supplied to said chamber through said nozzle.

6. In a device of the character described, the combination with a meter casing having inlet and outlet passages, of a chamber of circular cross section within said casing provided with webs connected with the sides thereof and having a wall provided with complementary inlet nozzle openings substantially tangential with respect to said chamber, the lower end of said chamber being in direct communication with said outlet passage for unobstructed delivery thereto of fluid entering through said nozzles, and a bladed rotor disposed substantially axially in said chamber and adapted to partake of the rotative component of movement of the vortex in said chamber resulting from the entry of fluid through said nozzles, said chamber being provided with complementary substantially tangential inlet nozzles at a level lower than that of said rotor, whereby fluid entering therethrough will provide a whirling support for the body of fluid in which said rotor is disposed.

7. In a device of the character described, the combination with a casing providing an inlet and an outlet, of a substantially cylindrically walled chamber provided in its walls with tangential nozzle openings communicating with said inlet and having unobstructed axial communication with said outlet, whereby the flow of fluid through said casing will establish a vortex in said chamber of which the rotation will be substantially directly in proportion to the flow, and a rotor disposed axially within said chamber and provided with a vane adapted to be rotated by the vortex therein, said vane being substantially removed from the direct influence of fluid entering said chamber through said jets, whereby to rotate substantially in exact accordance with the rotation of said vortex.

8. Apparatus for measuring fluid flow, comprising a chamber, means for introducing fluid flow thereinto at a plurality of elevations establishing therein a vortex involving, in a plurality of component vortices, all of the fluid to be measured, a measuring instrument exposed in said chamber to the action of less than the total number of component vortices, and a discharge conduit communicating with said chamber, the rotation of one component vortex maintaining the rotation of all portions of the total vortex to which said measuring instrument is exposed.

9. Apparatus for measuring fluid flow, comprising a chamber, means for introducing fluid flow thereinto at a plurality of elevations establishing therein a vortex involving, in a plurality of component vortices, all of the fluid to be measured, a measuring instrument exposed in said chamber to the action of less than the total number of component vortices, and a discharge conduit communicating with said chamber in position to receive fluid from the several vortices through one thereof to which said measuring instrument is not exposed, the rotation of one component vortex maintaining the rotation of all portions of the total vortex to which said measuring instrument is exposed.

10. A meter comprising the combination with a free-turning, straight vaned rotor, of an unobstructed chamber of axially undiminishing circular cross section materially exceeding the rotor in radius and provided at axially remote points with a tangential inlet and an outlet at least equal in radius to the maximum radius of said chamber and with which the periphery of the chamber directly communicates for delivery of foreign matter centrifugally held to the wall of said chamber by fluid rotation therein, and an outlet duct of a cross sectional area at least equal to the cross sectional area of said tangential inlet.

11. A meter comprising the combination with a free-turning rotor, of an unobstructed chamber of circular cross section materially exceeding the rotor in radius and provided at axially remote points with a tangential inlet and an unobstructed outlet with which the periphery of the chamber directly communicates for delivery of foreign matter centrifugally held to the wall of said chamber by fluid rotation therein, said outlet being the full diameter of said chamber.

12. In a meter, the combination with a free-turning rotor, of a cylindrical chamber enclosing the rotor and having at axially remote points a tangential inlet and an outlet the full diameter of the chamber, whereby dirt centrifugally impelled to the wall of the chamber in the helical movement of fluid therethrough will find free and unobstructed peripheral egress, said chamber also having a secondary inlet of different flow characteristics from the first and disposed between said rotor and said outlet and between said first mentioned inlet and said outlet.

ROY O. HENSZEY.